(12) United States Patent
Cheng

(10) Patent No.: US 7,260,996 B2
(45) Date of Patent: Aug. 28, 2007

(54) PRESSURE MEASURING APPARATUS AND PRESSURE SENSOR THEREOF

(75) Inventor: Andrew Cheng, Tao Yuan (TW)

(73) Assignee: Signal Electronic Co., Ltd., Taipei (TW)

( * ) Notice: Subject to any disclaimer, the term of this patent is extended or adjusted under 35 U.S.C. 154(b) by 0 days.

(21) Appl. No.: 11/298,484

(22) Filed: Dec. 12, 2005

(65) Prior Publication Data

US 2007/0137306 A1    Jun. 21, 2007

(51) Int. Cl.
  *G01L 9/00* (2006.01)
(52) U.S. Cl. .................. 73/754; 73/753; 361/283.1
(58) Field of Classification Search .......... 73/700–756; 361/283.1–283.4
  See application file for complete search history.

(56) References Cited

U.S. PATENT DOCUMENTS

| | | | | |
|---|---|---|---|---|
| 5,030,848 A | * | 7/1991 | Wyatt | 327/548 |
| 5,456,117 A | * | 10/1995 | Imaeda et al. | 73/727 |
| 5,473,944 A | * | 12/1995 | Kurtz et al. | 73/704 |
| 5,734,301 A | * | 3/1998 | Lee et al. | 331/2 |
| 6,308,575 B1 | * | 10/2001 | Yang et al. | 73/727 |
| 6,422,088 B1 | * | 7/2002 | Oba et al. | 73/754 |
| 6,595,065 B2 | * | 7/2003 | Tanizawa et al. | 73/720 |
| 6,973,836 B2 | * | 12/2005 | Katsumata et al. | 73/754 |

* cited by examiner

*Primary Examiner*—Edward Lefkowitz
*Assistant Examiner*—Jermaine Jenkins
(74) *Attorney, Agent, or Firm*—Troxell Law Office, PLLC

(57) ABSTRACT

The present invention relates to a pressure measuring apparatus, characterized in that: the pressure measuring apparatus comprises a pressure sensor having a first resistor for sensing an external stress and a second resistor acting as a reference, wherein the second resistor is acting as a reference while the first resistor is used for measuring an external stress in that a first oscillating signal received by an end of the first resistor is affected by the external stress, and consequently an affected first oscillating signal varied with respect to the external stress is outputted from the other end of the first resistor, and a second oscillating signal received by an end of the first resistor is outputted from another end of the second resistor without being affected by the external stress. Hence, the present invention provides a pressure measuring apparatus and a pressure sensor thereof using the frequency difference of the oscillating signal in accordance to the variation of the resistor value as base for measuring the external stress. Hence, the present invention requires no amplifier and A/D converter so that the whole manufacturing process is simplified and also the overall cost of the pressure measuring apparatus is reduced.

2 Claims, 6 Drawing Sheets

PRESSURE MEASURING APPARATUS AND PRESSURE SENSOR THEREOF

BACKGROUND OF THE INVENTION (a). Field of the Invention

The present invention relates to a pressure measuring apparatus and a pressure sensor thereof, more particularly, to a pressure measuring apparatus comprises a first resistor for sensing an external stress and a second resistor acting as a reference.

(b). Description of the Prior Arts

The working principle of pressure sensors currently available on the market, such as tire gauge, etc., is based on that the resistor buried in the pressure sensor will present different characteristics in accordance to the stress applied on the sensor. Please refer to FIG. 1A and FIG. 1B, which are respectively a side view and a sectional view schematically depicting a pressure sensor of the prior art. As seen in FIG. 1A, the pressure sensor 100 has four resistors 121-127 located on the top 115 of the substrate 110, moreover, as seen in FIG. 1B, a recess 129 is located at the center of the bottom 120 of the substrate 110, wherein the two resistors 123, 127 located on the top 115 of the substrate 110 are arranged intentionally at the places which are opposite to the two side of the recess 129.

Therefore, when an external stress is applied on the top 115 of the pressure sensor's 100 substrate 110, the external stress will be concentrated toward the area on the top 115 of the substrate 110 which is direct opposite to the recess 129 of the substrate 110, i.e. the area between the resistor 123 and the resistor 125 on the top 115 of the substrate 110. In this regard, the characteristics of the resistors 123, 125 are prone to be changed while receiving an external stress. But, on the other hand, the resistors 121, 127 are not. Thus, when an electric bridge is formed using the four resistors 121-127, the changes happened in the resistor 123 and the resistor 125 will cause a voltage difference to happen between the two nodes of the electric bridge so that the magnitude of the external stress can be measured accordingly.

Please refer to FIG. 2, which is a circuitry depicting a pressure measuring apparatus in accordance to the prior art. As seen in FIG. 2, the pressure measuring apparatus 200 is controlled by an user using the human-machine interface 210 by which the user can control the system oscillator 220 to generate a working frequency for the whole pressure measuring circuitry 200, i.e. to generate a working frequency for controlling the components in the pressure measuring circuitry 200, which are an amplifier 230, an analogue to digital converter (A/D converter) 240, a numerical converter 250 and a display controller 270. Yet, the pressure sensor 260 within the pressure measuring apparatus 200 uses the resistors 121-127 of FIG. 1 to form an electric bridge, wherein the resistors 121-127 have identical characteristics and resistor values before measuring an external stress.

Hence, when the pressure sensor 260 is connected with a reference voltage $V_{DD}$ for measuring an external stress, the external stress will cause the characteristics and the resistor values of the two resistor 123, 125 to change and subsequently have affect on the voltages over the two resistors 123, 125, moreover, the voltages on node 1 will also be different from the voltages on node 2. In order to use the voltage difference between the two nodes, i.e. node 1 and node 2, the voltage signal 261 of node 1 and the voltage signal 262 of node 2 are amplified by the amplifier 230 to become the signals 265, 267 that can be received by the A/D converter 240. Afterward, the foregoing analogue signals 265, 267 are converted by the A/D converter 240 to become the digital signals 269, 271 for proceeding with table lookup in the numerical converter 250.

After the digitized voltage signal 269 of node 1 and voltage signal 271 of node 2 are compared using the lookup table of the numerical converter 250, an signal 273 representing the magnitude of the external stress can be acquired using the voltage difference between the node 1 and the node 2. Finally, the external stress value signal 273 is outputted to the monitor 280 through the display controller 260 for showing the measured magnitude of the external stress on the monitor 280.

However, the pressure measuring apparatus 200 of the prior art has the following shortcomings:

1. The voltages on the node 1 and the node 2 are small voltages that will change in response to external stresses, moreover, small voltage variation will require to be amplified using the amplifier 230 before it is capable of being converted into digital signals. Thus, before converting the analogue signals of the voltages on the node 1 and the node 2, the voltages on the node 1 and the node 2 have to be amplified using the amplifier 230 to an extent that the A/D converter 240 can receive.
2. The amplifier 230 is a component having characteristics of high electricity consumption and high cost. Thus, the produces using the aforementioned pressure measuring apparatus 200 are not portable because of the characteristic of high electricity consumption will result in the apparatus 200 is incapable of using ordinary batteries, moreover, the high cost of the amplifier 230 will cause the produces using the aforementioned pressure measuring apparatus 200 to have no competitiveness in the industry.
3. Similar condition is also happening to the A/D converter 240 that the production cost thereof is high because of the high production precision requirement. Thus, the A/D converter 240 will cause the produces using the aforementioned pressure measuring apparatus 200 to suffer the same industrial competition problem.

In view of this, the present invention provides a pressure measuring apparatus and a pressure sensor thereof using no amplifier and A/D converter so as to reduce the whole production cost of the pressure measuring circuitry.

SUMMARY OF THE INVENTION

The primary object of the present invention is to provide a pressure sensor comprises a first resistor for sensing an external stress and a second resistor acting as a reference, wherein the second resistor is acting as a reference while the first resistor is used for measuring an external stress in that a first oscillating signal received by a first end of the first resistor is affected by the external stress, and consequently an affected first oscillating signal varied with respect to the external stress is outputted from a second end of the first resistor, and a second oscillating signal received by a first end of the first resistor is outputted from a second end of the second resistor without being affected by the external stress.

Another object of the present invention is to provide a pressure measuring apparatus, comprising an aforesaid pressure sensor having a first resistor and a second resistor, and a pressure measuring circuitry, wherein the pressure measuring circuitry generates a first oscillating signal between the first end and the second end of the first resistor, and generates a second oscillating signal between the first end and the second end of the second resistor. Hence, when the first resistor is affected by an external stress and outputs an affected first oscillating signal corresponding to the variation of the external stress from its second end, the pressure measuring circuitry will be able to measure the external stress basing on the first oscillating signal by comparing the same with the reference of the second oscillating signal.

In a preferred embodiment of the present invention, the pressure measuring apparatus of the invention comprises: a capacitance, having a first end coupled to a node connecting to the first ends of the first and the second resistors, and a second end being grounded; and an oscillating signal controller being connected to the node, having a first input terminal coupled to the second end of the first resistor and a second input terminal coupled to the second end of the second resistor; wherein the oscillating signal controller along with the capacitance generates the first oscillating signal at the place between the first end and the second end of the first resistor, and also generate the second oscillating signal at the place between the first end and the second end of the second resistor.

In the preferred embodiment of the present invention, the pressure measuring circuitry not only comprises the aforementioned oscillating signal controller and the capacitance, but further comprises a numerical converter, a display controller, a monitor, a human-machine interface and a system oscillator.

The numerical converter will receive and compare the first oscillating signal and the second oscillating signal so as to output a data signal thereafter. The display controller then receives the data signal outputted from the numerical converter and transfer thereof to the monitor. Finally, the monitor receives and displays the data signal coming from the display controller.

Furthermore, the whole pressure measuring apparatus primarily is operated by a user using a control signal issued by means of the human-machine interface so as to activate oscillating signals needed for generating outputs of the pressure measuring apparatus, moreover, the oscillating signals will be send to the oscillating signal controller, the numerical converter and the display controller.

To sum up, the present invention provides a pressure measuring apparatus and a pressure sensor thereof using no amplifier and A/D converter so as to reduce the overall cost of the pressure measuring circuitry.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PRESENT INVENTION

The following embodiments will illustrate the device and the method for processing the digital image of the present invention in detail.

Current pressure measuring apparatus generally employs electric bridge formed with resistors as pressure sensor. When the electric bridge is subjected to an external stress, the electric bridge will generate a small voltage proportional to the external stress. The small voltage is required to be amplified by an amplifier so that it can be received and converted by an A/D converter to a digital signal. The digital signal is then transformed into a data signal using a numerical converter. Finally, the data signal is displayed on a monitor showing the magnitude of the external stress that is comprehensible for a user. However, using the pressure measuring apparatus of the prior art to measure an external stress requires transforming a small voltage variation into a digital signal using a amplifier and an A/D converter, and consequently the electric consumption of the pressure measuring apparatus of the prior art is high so that the foregoing apparatus is not portable since using battery as power source of the apparatus is impossible, furthermore, the amplifier and the A/D converter used in the foregoing apparatus will greatly increase its production cost.

Therefore, the present invention uses an oscillating signal as the signal source of the pressure measuring apparatus accordingly. That is, by means of one characteristic of resistor that the resistor value thereof will vary while subjecting to an external stress, and also the oscillating signal will vary in frequency and the variation of frequency is in proportion to the variation of the resistor value, thus, the external stress can be measured by measuring the variation of the oscillating signal frequency. Therefore, the pressure measuring apparatus of the present invention will require only one resistor and will have no need for amplifier and A/D converter.

Figure 1A:
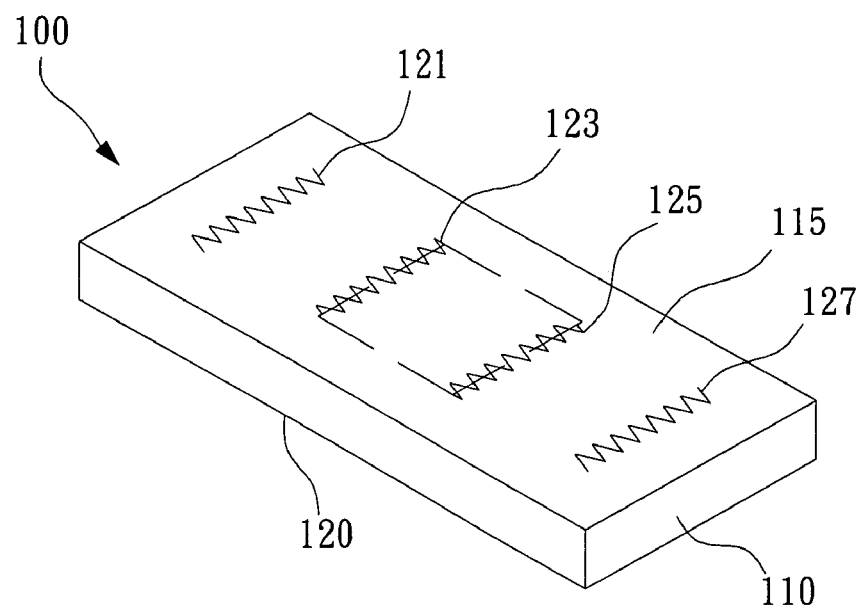
FIG. 1A is a side view schematically depicting a pressure sensor of the prior art.
Figure 1B:
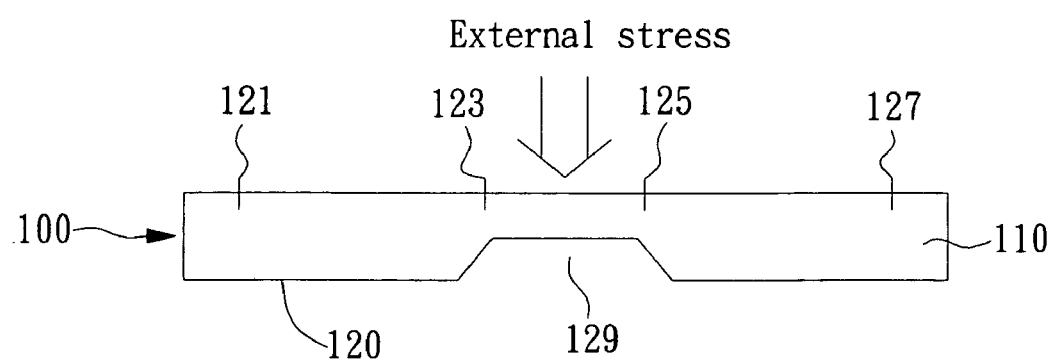
FIG. 1B is a sectional view schematically depicting a pressure sensor of the prior art.
Figure 2:
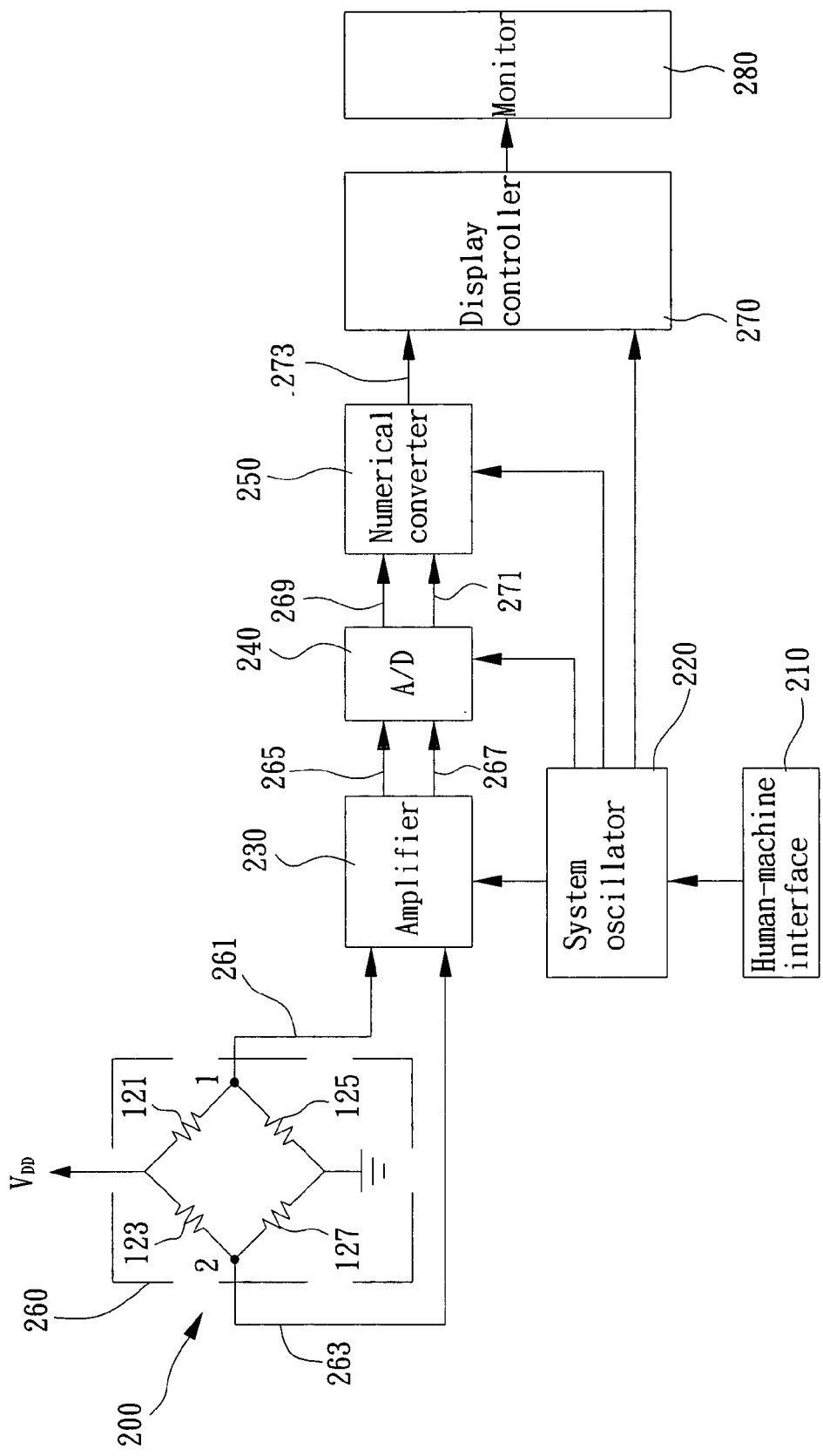
FIG. 2 is a circuitry depicting a pressure measuring apparatus in accordance to the prior art.
Figure 3A:
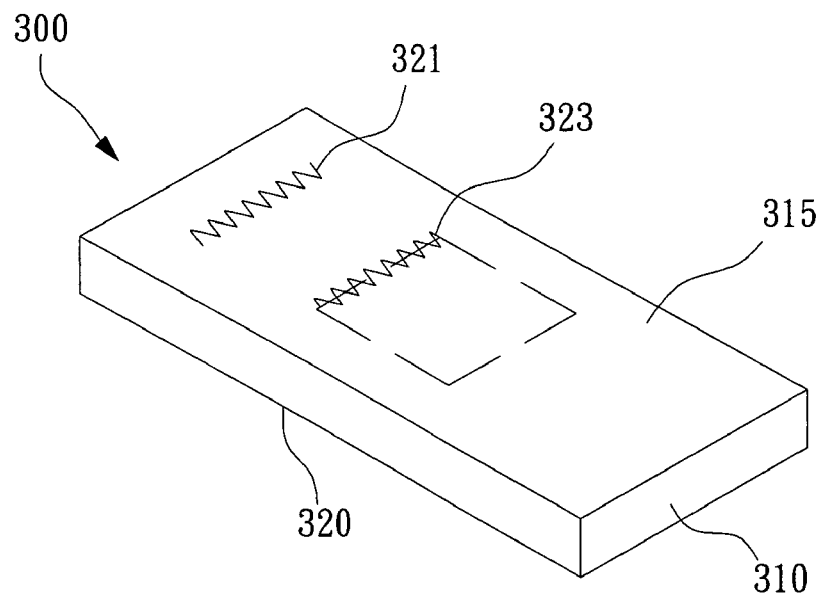
FIG. 3A is a side view schematically depicting a pressure sensor according to a preferred embodiment of the present invention.
Figure 3B:
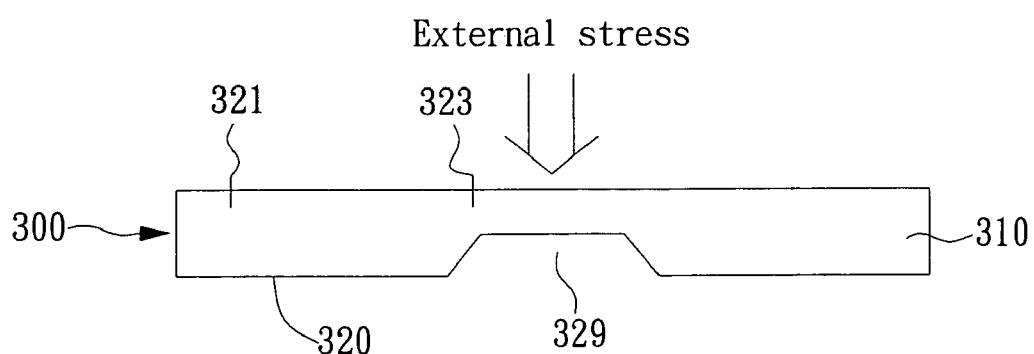
FIG. 3B is a sectional view schematically depicting a pressure sensor according to a preferred embodiment of the present invention.

Please refer to FIG. 3A and FIG. 3B, which are respectively a side view and a sectional view schematically depicting a pressure sensor of the present invention. As seen in FIG. 3A, the pressure sensor 300 is roughly similar to the pressure sensor 100 of FIG. 1A, and as seen in FIG. 3B, a recess 329 is also similarly located at the center of the bottom 320 of the substrate 310. What's different is that the pressure sensor 300 has only one resistor 323 located on the top 315 of the substrate 310 corresponding to one side of the recess 329 for measuring the external stress. On the other hand, the resistor 321 located at a side of the resistor 323 is user as a stationary resistor for comparing with the resistor 323 while subjecting to an external stress.

Figure 4:
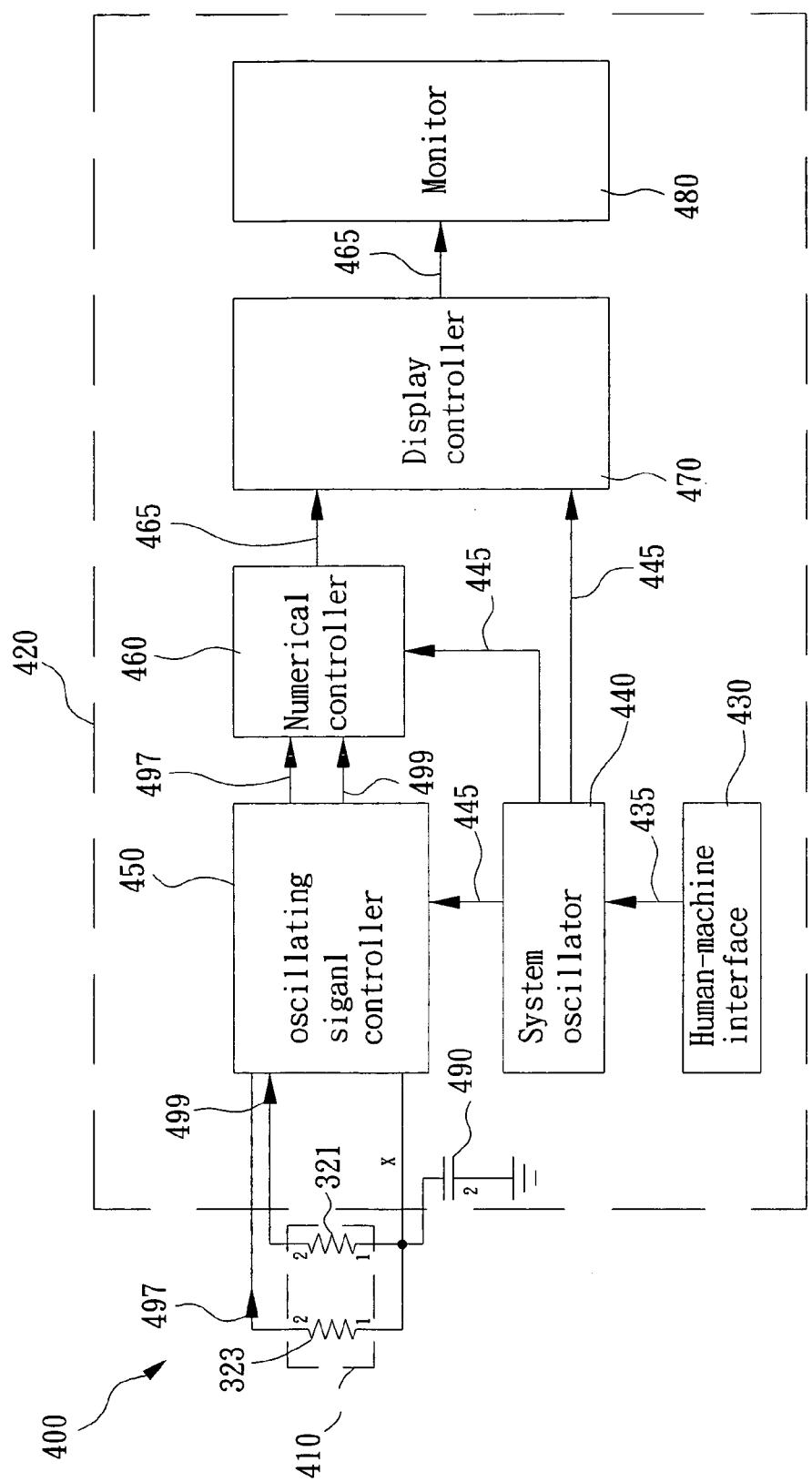
FIG. 4 is a circuitry depicting a pressure measuring apparatus according to a preferred embodiment of the present invention.

Please refer to FIG. 4, which is a circuitry depicting a pressure measuring apparatus according to a preferred embodiment of the present invention. The pressure measuring apparatus 400 mainly is composed of a pressure sensor 410 and a pressure measuring circuitry 420. Wherein, the pressure sensor comprises the resistor 323 of FIG. 3A for sensing the external stress and the resistor 321 acting as a reference, and the pressure measuring circuitry 420 is composed using: a human-machine interface 430, a system oscillator 440, an oscillating signal controller 450, a numerical converter 460, a display controller 470, a monitor 480, a capacitance 490.

Since a human-machine interface 430 is used in the pressure measuring apparatus 400, a user can control the whole pressure measuring apparatus 400 using the human-machine interface 430. When the pressure measuring apparatus 400 is used by a user, the user can input a control signal 435 to the system oscillator 440 using the human-machine interface 430 so as to enable the system oscillator 440 to generate system oscillating signals 445 for used as an working frequency of the pressure measuring circuitry 420. Hence, the system oscillating signals 445 are outputted from the system oscillator 440 to the oscillating signal controller 450, the numerical converter 460, and the display controller 470.

Since in the preferred embodiment of the present invention, the pressure sensor uses the resistor 323 for sensing external stresses, and the resistor 321 is used as reference for comparing with the resistor 323 subjecting to an external stress. In this regard, the first end of the resistor 323, the first end of the resistor 321, the first end of the capacitance 490 are all coupled to the node x, and the second end of the resistor 323 and the second end of the resistor 321 respectively is connected to two different input terminals of the oscillating signal controller 450, moreover, the resistor 323 and the resistor 321 are the same in characteristic and have the same resistor value.

Hence, when the pressure measuring apparatus 400 is used by a user through the human-machine interface 430, the circuit between the oscillating signal controller 450 and the second end of the capacitance 490 which is ground connected will generates a first oscillating signal 497 at the place between the first end and the second end of the resistor 323 by way of the oscillating signal controller 450 and the capacitance 490, wherein the resistor 323 will be affected by an external stress so as to output an first oscillating signal 497 varied in proportion to the external stress from the second end of the resistor 323. Simultaneously, the oscillating signal controller 450 and the capacitance 490 will also generate a second oscillating signal 499 at the place between the first end and the second end of the resistor 321. However, the second oscillating signal 499 is configured in the way that it will not vary with the external stress, so that an stationary second oscillating signal 499 is outputted from the second end of the resistor 321.

In another word, when the pressure measuring apparatus 400 is used by a user that the pressure sensor 410, i.e. the resistor 323, inside the apparatus 400 is used for measuring an external stress, the external stress will vary the resistor value of the resistor 323. Thus, during the measuring process, the frequency of the first oscillating signal 497 generated by the oscillating signal controller 450 and the capacitance 490 between the first end and the second end of the resistor 323 will change in accordance to the variation of the external stress, the same time that the frequency of the second oscillating signal 499 also generated by the oscillating signal controller 450 and the capacitance 490 between the first end and the second end of the resistor 321, on the contrary, will not change with the variation of the external stress.

After the oscillating signal controller 450 receives the first oscillating signal 497 and the second oscillating signal 499 inputted respectively from the second end of the resistor 323 and the second end of the resistor 321, the oscillating signal controller 450 will transmit the two oscillating signals 497, 499 to the numerical converter 460.

When the two oscillating signals 497, 499 transmitted from the oscillating signal controller 450 are received by the numerical converter 460, the process of table lookup can be proceeded basing on the frequencies of the two oscillating signals 497, 499 for acquiring a data signal 465 representing the magnitude of the external stress. The principle of the aforementioned process is as the following description: Before an external stress is applied on the pressure measuring apparatus 400, the resistor 323 and the resistor 321 have the same characteristic and resistor value so that the oscillating signals respectively generated by the oscillating signal controller 450 and the capacitance 490 between the two ends of the resistor 323 and the two ends of the resistor 32 will have the same frequency. However, when an external stress is applied on the pressure measuring apparatus 400, the same oscillating signal controller 450 and the same capacitance 490 are still used to generate oscillating signals both on the resistor 323 and the resistor 321 simultaneously, but the resistor 323 is used as a pressure sensor that the resistor value thereof will change in proportion to the external stress, moreover, the resistor 321 is employed as a reference that the resistor value thereof will not change in accordance to the external stress. Therefore, as mentioned before, the frequency of the first oscillating signal 497 generated by the oscillating signal controller 450 and the capacitance 490 between the first end and the second end of the resistor 323 will change in accordance to the variation of the external stress, the same time that the frequency of the second oscillating signal 499 also generated by the oscillating signal controller 450 and the capacitance 490 between the first end and the second end of the resistor 321, on the contrary, will not change with the variation of the external stress.

In this regard, the frequency difference between the first oscillating signal 497 and the second oscillating signal 499 is the result of the resistor value difference between the resistor 323 and the resistor 321 while measuring an external stress, moreover, the resistor value difference between the resistor 323 and the resistor 321 while measuring an external stress is caused by the external stress. Thus, the magnitude of the frequency difference between the two oscillating signals 497, 499 is directly proportional to the magnitude of the external stress.

Thus, when the two oscillating signals 497, 499 transmitted from the oscillating signal controller 450 are received by the numerical converter 460, the process of table lookup can be proceeded basing on the frequencies of the two oscillating signals 497, 499 for acquiring a data signal 465 representing the magnitude of the external stress.

The data signal 465 is then transmitted into the monitor 480 through the display controller 470 for showing a picture representing the magnitude of the external stress so that the user can comprehend the magnitude of the external stress measured using the pressure measuring apparatus 400.

Figure 5A:
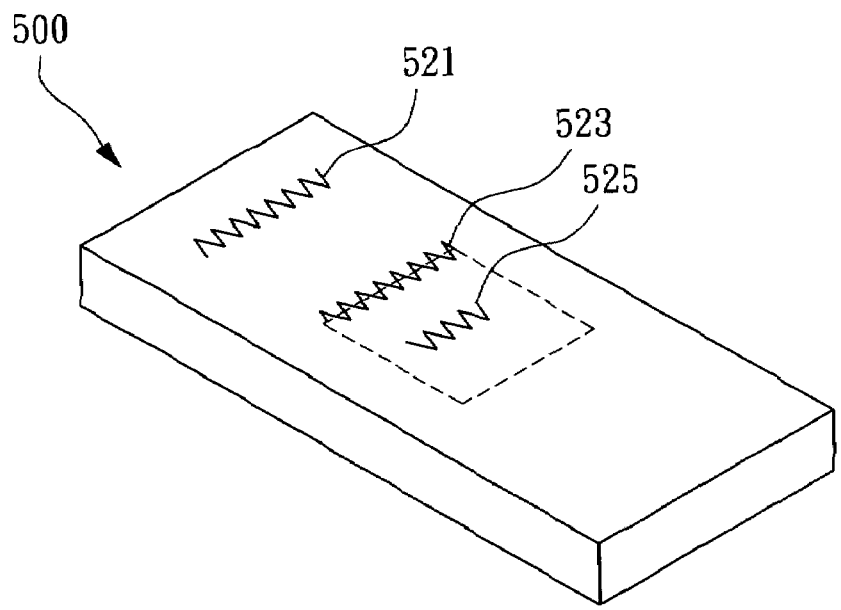
FIG. 5A and FIG. 5B are a side view and a sectional view schematically depicting a pressure sensor according to another preferred embodiment of the present invention in respective.
Figure 5B:
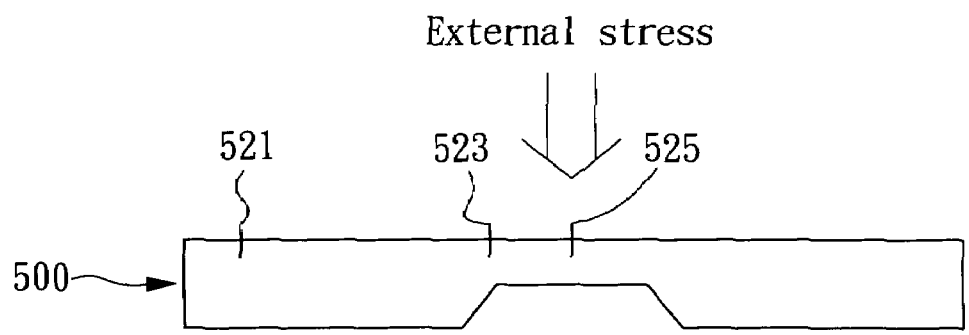
Figure 5C:
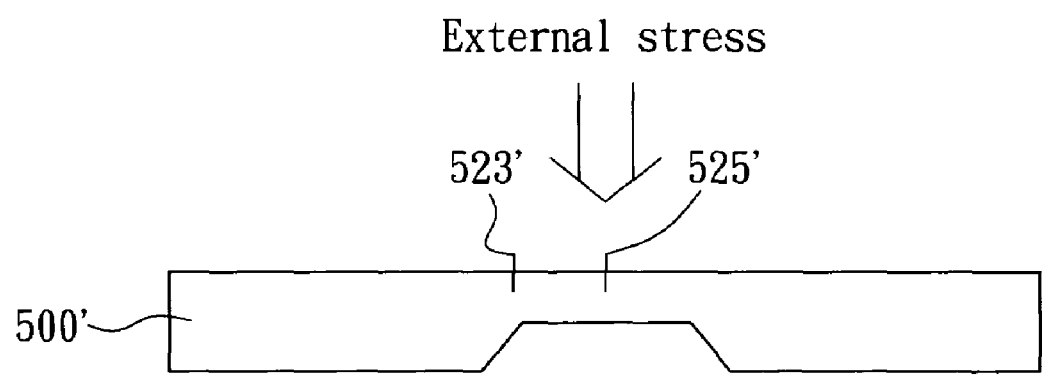
FIG. 5C is a sectional view schematically depicting a pressure sensor according to yet another preferred embodiment of the present invention.

Please refer to FIG. 5A and FIG. 5C, which are a side view and a sectional view schematically depicting a pressure sensor according to another preferred embodiment of the present invention in respective. The configuration of the pressure sensor 500 is similar to that of the pressure sensor 300 shown in FIG. 3A that it also has a first resistor 523 for sensing an external stress and a second resistor 521 acting as a reference. However, the pressure sensor 500 further has an additional third resistor 525, being arranged at the middle portion of the pressure sensor 500, which is also being used for sensing the external stress similar to the first resistor 523. As the pressure sensor 500 is subjected to an external stress exerting at the middle portion thereof, the resistor value of the third resistor 525 will increase in proportion to the decrease of the external stress since it is being placed right at the position of the pressure sensor 500 directly being pressed by the external stress, but the resistor value of the first resistor 523 will increase in proportion to the increase of the external stress since it is being placed at a position of the pressure sensor 500 that is to be stretched while subjecting to the external stress. That is, as the first resistor 523 is increasing with the increasing of an external stress while the third resistor 525 is decreasing with the increasing of the external stress, the variation of the external stress can be measured by comparing the varied resistor values of the two resistors 523, 525 with the reference of the second resistor 521. Moreover, by the additional third resistor, not only the measurable range of the pressure sensor 500 is enlarged, but also the measuring accuracy is enhanced.

Moreover, it is noted that a pressure sensor 500' of FIG. 5C similar to the pressure sensor 500 of FIG. 5A, but without the second resistor 521 acting as a reference, can also provide a preferred result of stress measurement by the cooperation of the first resistor 523' and the third resistor 525', since as the first resistor 523' is increasing with the increasing of an external stress while the third resistor 525' is decreasing with the increasing of the external stress.

The preferred embodiment of the present invention uses the resistor 323 whose resistor value can be affected by an external stress, moreover, the affected resistor value of the resistor 323 will have effect on the frequency of the oscillating signal 497 happening in the circuit between the capacitance 490, the resistor 323 and the oscillating signal controller 450 so that the oscillating signal 497 will not be the same as the oscillating signal 499 happening in the circuit between the capacitance 490, the resistor 321 and the oscillating signal controller 450. Therefore, the pressure measuring apparatus of the present invention is a pressure measuring apparatus utilizing the variation of resistor value to change the frequency of the oscillating signal (R to F), and has advantages as following:

1. The present invention uses the frequency difference of the oscillating signal as base for measuring the external stress, which is different from the apparatus of the prior art using the voltage difference as base for measuring the external stress. Thus, the present invention provides a pressure measuring apparatus using no amplifier and A/D converter so as to reduce the overall cost of the pressure measuring apparatus.
2. Since the present invention uses no amplifier and A/D converter, the electric consumption is reduced and therefore ordinary batteries can be used as power source of the present invention. Consequently, the present invention is portable.
3. Since the present invention uses the frequency difference of the oscillating signal as base for measuring the external stress, the pressure sensor of the present invention can be a single resistor that simplifies the manufacturing process of the pressure measuring apparatus.
4. Since the present invention has lower cost and simplified manufacturing process comparing to the prior art, the present invention can be mass-produced with lower cost.
5. As there are two resistors being installed in the pressure sensor of the invention, one being placed at a position of the pressure sensor that is to be stretched while subjecting to the external stress while another one being placed right at the position of the pressure sensor 500 directly being pressed by the external stress, the pressure sensor can also provide a preferred result of stress measurement by the cooperation of the stretched resistor and the pressed resistor since as the stretched resistor is increasing with the increasing of the external stress while the pressed resistor is decreasing with the increasing of the external stress.

To sum up, the present invention provides a pressure measuring apparatus and a pressure sensor thereof using the frequency difference of the oscillating signal in accordance to the variation of the resistor value as base for measuring the external stress. Hence, the present invention requires no amplifier and A/D converter so that the whole manufacturing process is simplified and also the overall cost of the pressure measuring apparatus is reduced.

What is claimed is:

1. A pressure sensor for measuring an external stress comprising:
    a) a substrate having:
        i) a bottom surface;
        ii) a recess formed in the bottom surface of the substrate; and
        iii) a top surface having a first area and a second area, the first area is located directly above the recess and the second area is located around the first area; and
    b) an apparatus having a first resistor and a second resistor, the first resistor is located on the top surface of the substrate in the first area and the second resistor is located in the top surface of the substrate in the second area surrounding the first area,
    wherein, when the pressure sensor is exposed to the external stress, the first resistor measuring the external stress by varying a first oscillating signal input into a first end of the first resistor and outputting a varied first oscillating signal from a second end thereof, and the second resistor receiving an input second oscillating signal in a first end thereof and outputting an output second oscillating signal from a second end thereof, the input second oscillating signal and the output second oscillating signal are unaffected by the external force.

2. A pressure sensor for measuring an external stress comprising:
    a) a substrate having:
        i) a bottom surface;
        ii) a recess formed in the bottom surface of the substrate; and
        iii) a top surface having a first area and a second area, the first area is located directly above the recess and the second area is located around the first area; and
    b) an apparatus having a first resistor, a second resistor, and a third resistor, the third resistor is on the top surface of the substrate in a middle portion of the first area, the first resistor is located on the top surface of the substrate in the first area and spaced a predetermined distance from the third resistor, and the second resistor is located in the top surface of the substrate in the second area surrounding the first area,
    wherein, when the pressure sensor is exposed to the external stress, the first resistor measuring the external stress by varying a first oscillating signal input into a first end of the first resistor and outputting a varied first oscillating signal from a second end thereof, the second resistor receiving an input second oscillating signal in a first end thereof and outputting an output second oscillating signal from a second end thereof, the input second oscillating signal and the output second oscillating signal are unaffected by the external force, the third resistor receiving an input third oscillating signal and outputting an output third oscillating signal decreasing as the external stress increases.

* * * * *